United States Patent
Lindner et al.

(10) Patent No.: US 9,381,556 B2
(45) Date of Patent: Jul. 5, 2016

(54) MULTIPART ROLLER

(75) Inventors: Florian Lindner, Netphen (DE); Jochen Münker, Kreuztal (DE); Olaf Norman Jepsen, Siegen (DE); Peter Rainer, Hilchenbach (DE)

(73) Assignee: SMS GROUP GMBH, Düsseldorf (DE)

(*) Notice: Subject to any disclaimer, the term of this patent is extended or adjusted under 35 U.S.C. 154(b) by 1873 days.

(21) Appl. No.: 12/451,999

(22) PCT Filed: Jun. 12, 2008

(86) PCT No.: PCT/EP2008/004694
§ 371 (c)(1),
(2), (4) Date: Dec. 11, 2009

(87) PCT Pub. No.: WO2008/151795
PCT Pub. Date: Dec. 18, 2008

(65) Prior Publication Data
US 2010/0101243 A1 Apr. 29, 2010

(30) Foreign Application Priority Data

Jun. 14, 2007 (DE) .......................... 10 2007 027 439
Jun. 10, 2008 (DE) .......................... 10 2008 027 494

(51) Int. Cl.
*F25D 25/00* (2006.01)
*B21B 27/03* (2006.01)
(Continued)

(52) U.S. Cl.
CPC ............... *B21B 27/032* (2013.01); *B21B 13/14* (2013.01); *B21B 27/021* (2013.01); *B21B 27/03* (2013.01); *F16C 13/00* (2013.01)

(58) Field of Classification Search
CPC .................................. F25D 3/11; F25D 25/04
USPC .................. 62/64, 373, 374, 121; 239/8, 128; 72/201
See application file for complete search history.

(56) References Cited

U.S. PATENT DOCUMENTS 2,126,893 A * 8/1938 Klamp ..................... 29/898.066
3,997,953 A * 12/1976 Christ et al. ...................... 492/2
(Continued)

FOREIGN PATENT DOCUMENTS

CN 1039212 A 1/1990
DE 41 11 852 10/1991
(Continued)

OTHER PUBLICATIONS

Government of India Patent Office, Office Action dated Feb. 25, 2015, 2 pages.

*Primary Examiner* — Melvin Jones
(74) *Attorney, Agent, or Firm* — Lucas & Mercanti, LLP; Klaus P. Stoffel

(57) ABSTRACT

A roller for a rolling mill with a casing, a left half pivot, and a right half pivot. The half pivots in the region surrounded by the casing are constructed as a truncated cone and form a left surface on the left half pivot and a right surface on the right half pivot. The left half pivot and the right half pivot have boreholes and corresponding grooves formed on the surfaces. The half pivots are inserted in the casing and are braced with one another by at least one tie rod. An hydraulic oil in boreholes and grooves is passed into or onto the left half pivot and the right half pivot. The hydraulic oil exerts a pressure on the casing to expand the casing. With the casing expanded, the stop surfaces and the face surfaces of the casing are pressed onto one another by the tie rod.

13 Claims, 3 Drawing Sheets

(51) Int. Cl.
  *B21B 13/14* (2006.01)
  *B21B 27/02* (2006.01)
  *F16C 13/00* (2006.01)

(56) References Cited

U.S. PATENT DOCUMENTS

| | | |
|---|---|---|
| 4,416,137 A | 11/1983 | Marshall |
| 5,103,542 A | 4/1992 | Niskanen |
| 6,286,355 B1 | 9/2001 | Figge |
| 7,891,224 B2 * | 2/2011 | Cooper et al. ............... 72/243.6 |
| 2007/0107482 A1 * | 5/2007 | Zieser et al. ................. 72/241.8 |

FOREIGN PATENT DOCUMENTS

| | | |
|---|---|---|
| DE | 102007055475 A1 * | 1/2009 |
| EP | 1056553 B1 | 12/2000 |
| JP | 60 115308 | 6/1985 |
| JP | S60115312 A | 6/1985 |
| JP | 11129017 | 5/1999 |
| RU | 2210449 C1 * | 8/2003 |
| WO | 2007/006467 | 1/2007 |

* cited by examiner

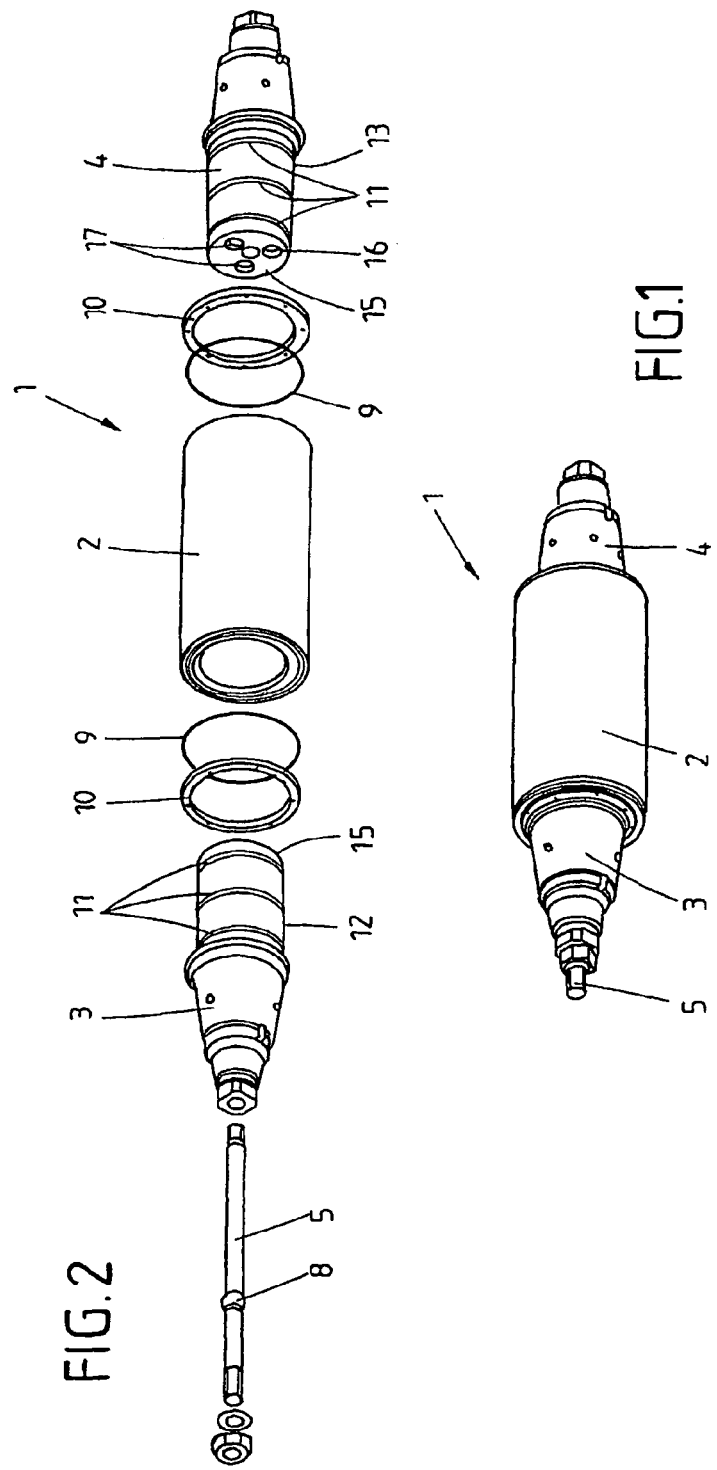

MULTIPART ROLLER

The invention pertains to a roll, especially to a work roll or a backup roll for a rolling mill such as plate rolling mill, a flat rolling mill, or the like, with a casing, a left half-journal and a right half-journal.

A rolling mill with work rolls and multipart backup rolls is known from the EP 1 056 553 B1. The backup rolls consist of a base body, on which several roller bearings arranged next to each other in the longitudinal direction are arranged. The outer rings of these bearings rotatably support a casing, which surrounds the roller bearings. The inside surface of the casing rests on the outside surfaces of the outer rings of the roller bearings all the way around. The outside surface of the casing forms the barrel of the backup roll, wherein three roller bearings are provided along the length of the base body, the middle roller bearing being configured as a tapered roller bearing, whereas the two outer roller bearings are configured as cylindrical roller bearings. A power-driven eccentric bushing, which can be rotated around the longitudinal axis of the base body, is arranged between each of the two cylindrical roller bearings and the base body, wherein a tilting segment, which makes it possible to tilt the cylindrical roller bearing, is provided in the load-bearing area of the base body, between the base body and the eccentric bushing.

A multipart roll is also disclosed in U.S. Pat. No. 4,407,151.

WO 2007/006 467 A1, as the closest prior art, discloses a backup roll for a rolling mill such as a plate rolling mill, a flat rolling mill, or the like, consisting of a casing and a roll shaft or roll axle, wherein the roll shaft or roll axle has a multipart configuration; in particular, the roll shaft or roll axle is configured with a left half-journal and a right half-journal. According to the method for producing a roll of this type, the casing is heated internally to expand it. Then the half-journals are inserted into the casing and pushed against the right and left end walls of the casing. To ensure exact positioning, the half-journals comprise, for example, at least one stop edge around the circumference. After the casing has cooled, the backup roll, consisting of the casing, the right half-journal, and the left half-journal, is held together by a shrink-fit.

In this production method, after the parts have cooled, shrinkage stresses can remain in the joint, which can cause the joint to loosen even during the rolling process itself. This can lead to the permanent deformation of the roll the first time that it is used for rolling. The axial run-out errors which thus develop can be up to a millimeter in size. The resulting axial run-out error is eliminated by surface grinding, for example. As a result of a high rolling force acting on the roll in a different phase position, additional deformation in a new direction can occur.

The invention is therefore based on the goal of providing a roll and a method for producing the roll in which shrinkage stresses are avoided.

This goal is achieved according to the invention in that, in the case of a roll, especially a work or backup roll for a rolling mill such as a plate rolling mill, a flat rolling mill, or the like, with
   a casing,
   a left half-journal, and
   a right half-journal,
   wherein the half-journals are configured as truncated cones in the area surrounded by the casing and form a left surface on the left half-journal and a right surface on the right half-journal, the left half-journal and the right half-journal are each configured with bores and corresponding grooves, wherein the grooves are configured on the surfaces.

According to an embodiment of the invention, the grooves extend around the circumference. As a result, a uniform pressure around the entire circumference is achieved, which expands the casing equally in all directions.

Additional embodiments of the roll can be derived from the relevant subclaims.

The invention also pertains to a method for producing a roll, especially a work or backup roll, wherein
   the left half-journal and the right half-journal are inserted into the casing;
   the right half-journal and the left half-journal are clamped together by means of at least one tie rod;
   an oil under pressure is conducted into bores and grooves respectively in and on the left half-journal and the right half-journal;
   the oil under pressure exerts a pressure on the casing, as a result of which the casing is expanded; and
   after the casing has been expanded, the tie rod is used to press the stop surfaces against the end surfaces of the casing.

Expanding the casing by means of the oil under pressure makes it possible to deform it without causing shrinkage stresses like those which occur when heat is used. The expansion produced in the elastic region of the casing has the effect that the casing returns to its original shape after the excess pressure has been released.

Additional embodiments of the method can be derived from the relevant subclaims.

The roll with casing, left half-journal, and right half-journal is configured with seals to prevent the intrusion of dirt particles, for example, and of liquids such as water, coolant, and lubricants, and thus to avoid corrosion (tribocorrosion).

An exemplary embodiment of the invention is described in greater detail on the basis of a highly schematic drawing:

FIG. 1 shows a 3-dimensional view of the assembled roll with a casing, a left half-journal, and a right half-journal;

FIG. 2 shows an exploded diagram of the roll of FIG. 1;

Figure 3:
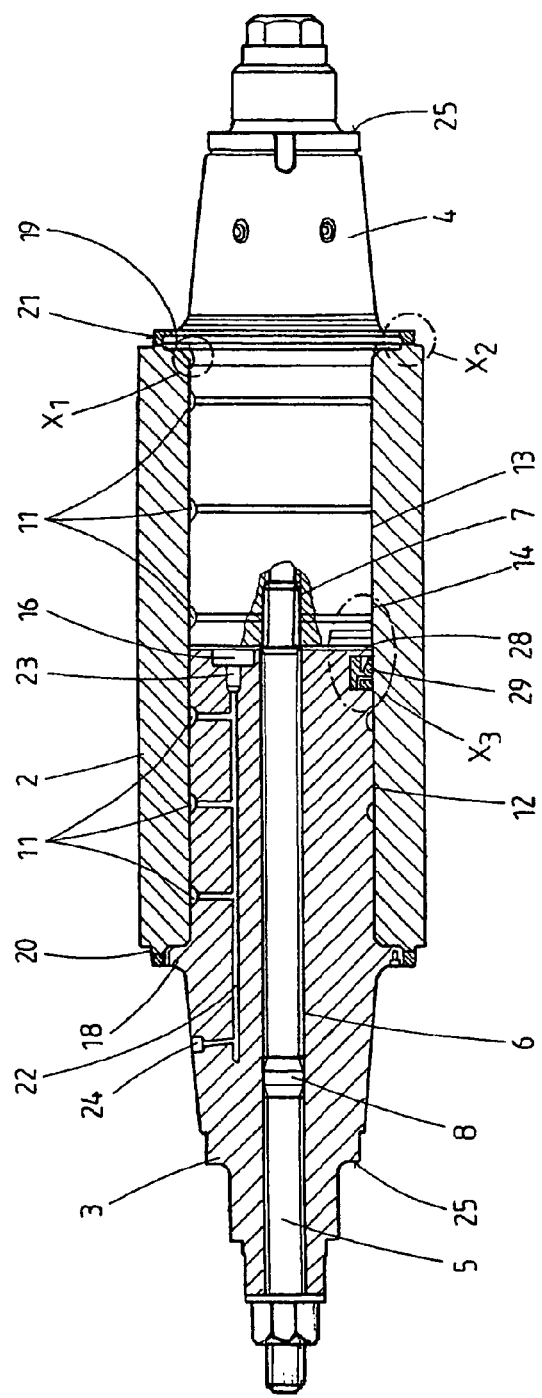
FIG. 3 shows a cross-sectional side view of the roll of FIG. 1.

FIG. 1 shows a 3-dimensional view of the assembled roll 1 with a casing 2, a left half-journal 3, and a right half-journal 4, which are clamped together by means of a tie rod 5.

FIG. 2 shows an exploded diagram of the roll 1 of FIG. 1 with additional elements. In this diagram, the left half-journal 3 is configured with a through-bore 6 (see FIG. 3), through which the tie rod 5 is guided and then screwed into a threaded bore 7 (see FIG. 3) in the right half-journal 4. At least one locally thickened area 8 is formed optionally on the tie rod 5, so that the tie rod 5 is guided in the through-bore 6 and cannot wobble. The thickened area 8 can also be a separate part or a set of separate parts, pushed onto the rod. The thickened area 8 can also be used to accommodate a seal. This makes it possible, during disassembly, to build up an internal pressure which pushes the components apart. At one end, the tie rod 5 comprises a thread corresponding to the threaded bore 7, and at the other end it comprises a thread with a nut and an optional washer. Alternatively, instead of the nut, the tie rod 5 can be configured as a screw. The roll 1 is also configured with seals 9 and seal carriers 10, which prevent the intrusion of dirt and the escape of fluids.

The left half-journal 3 and the right half-journal 4 comprise in each case at least one groove 11 on the surfaces 12 and 13, i.e., the surfaces which come in contact with the inside surface 14 of the casing 2; an oil under pressure is conducted through this groove. The oil under pressure is fed into the left half-journal 3 and into the right half-journal 4 through appropriate connectors (see FIG. 3).

The opposing end surfaces 15 of the left half-journal 3 and the right half-journal 4 comprise, in one embodiment, recesses 16 for plugs (see FIG. 3) and/or opposing bores 17, which make it possible to introduce pins (not shown) to prevent the two half-journals 3 and 4 from rotating with respect to each other.

Figures 4, 5:
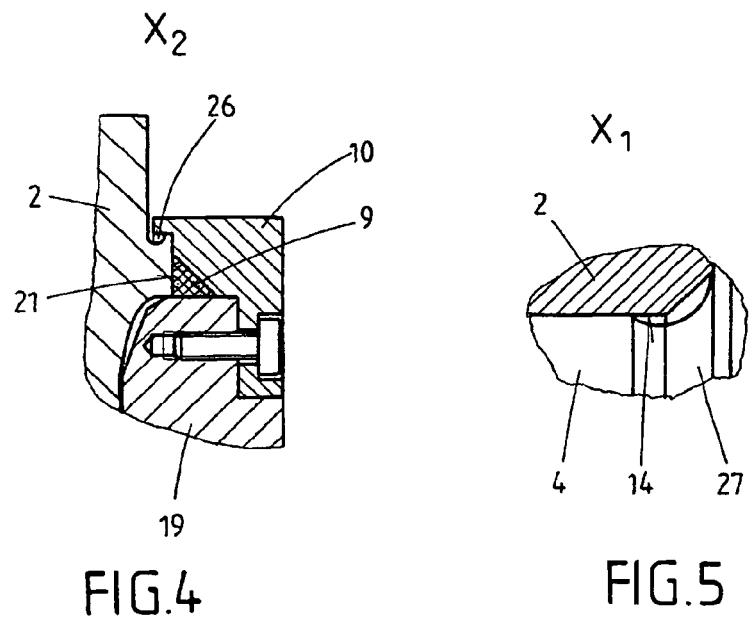
FIG. 4 shows the detail at position $X_2$.
FIG. 5 shows the detail at position $X_1$.

The cross-sectional side view of FIG. 3 shows the roll 1. Both the left half-journal 3 and the right half-journal 4 comprise stop surfaces 18 and 19, which are in contact with the left end surface 20 and the right end surface 21 of the casing 2. The stop surfaces 18 and 19 are optionally configured with seal carriers and seals 9, which prevent the intrusion of dirt into the roll and the intrusion or escape of fluids into or from the roll. Corresponding details are shown in FIGS. 4 and 5.

To assemble the roll 1, the left half-journal 3 and the right half-journal 4 are pushed into the casing 2 and clamped together by the tie rod 5. A hydraulic pretensioning device (not shown) is placed on the tie rod to pull the left half-journal 3 and the right half-journal 4 together inside the casing 2. The joining process is improved by expanding the casing 2 by means of oil under pressure until the end surface 20 comes in contact with the stop surface 18 and the end surface 21 comes in contact with the stop surface 19. Then the oil under pressure is released, and the casing 2 is now connected by a press-fit to the left half-journal 3 and the right half-journal 4.

The roll 1 can be disassembled so that the casing 2 can be replaced or reground separately. For this purpose, the casing 2 is again expanded by means of the oil under pressure, and the left half-journal 3 and the right half-journal 4 are pulled out of the casing; i.e., the press-fit is released. To expand the casing 2, the oil under pressure is supplied through bores 22 in the half-journals 3, 4 to the grooves 11. The preferably circumferential grooves 11 accept the oil under pressure. When the oil under pressure is forced into the bores 22 and the grooves 11 by means of suitable devices, the pressure is transmitted to the inside surface 14 of the casing 2, and the casing 2 is expanded. During assembly, the tie rod 5 and/or the pretensioning device pulls the left half-journal 3 and the right half-journal 4 together until the casing 2 is positioned precisely by the stop surfaces 18, 19.

The left half-journal 3 and the right half-journal 4 are configured as cones to facilitate the joining process. The casing 2 comprises corresponding, complementary conical surfaces on the inside. For this purpose, a flat cone with a conical taper of 1:15-1:100 is used for the components. The cone is configured with a single stage or multiple stages (stepped or staircased) in conical or cylindrical form.

To supply the oil under pressure, a bore 22 is formed in each half-journal 3, 4. The axially parallel bores 22 are closed off at one end by plugs 23 in the area of the end surfaces. At the other end, there is a connector 24 for a pressurized oil device (not shown), through which the oil under pressure reaches the bore 22 and the groove 11 and through which the pressure is built up. The connector 24 can also be provided alternatively at the outer end surface 25 of the half-journal 3, 4 and/or at the cylindrical outside surfaces of the stop surfaces 18, 19.

In the area of the end surfaces 15, the left half-journal 3 and the right half-journal 4 are configured with circumferential sealing grooves 28, in which sealing rings 29 are seated. When only one side of the casing 2 is expanded, the edge pressure is therefore supported in such a way that the oil under pressure cannot escape as the one half-journal 3 or 4 is inserted.

Figure 6:
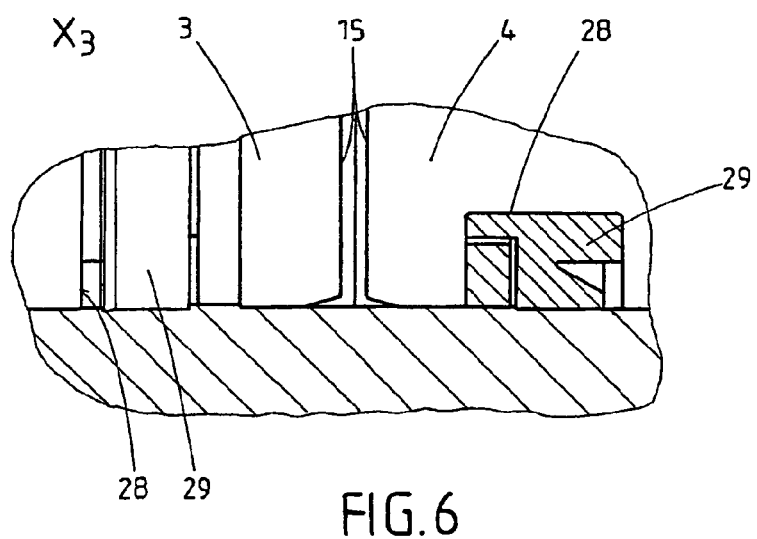
FIG. 6 shows the detail at position $X_3$.

Special embodiments of the roll 1 are shown in detail in FIG. 4 (position $X_2$), in FIG. 5 (position $X_1$), and in FIG. 6 (position $X_3$).

FIG. 4 show an enlarged view of the seal carrier 10 with the seal 9. The seal carrier 10 is screwed to the stop surface 19, wherein a seal 9 is pressed against the right end surface 21 of the casing 2. The right end surface 21 of the casing 2 is also configured with a water drain groove 26.

FIG. 5 shows an enlarged view of a relief groove 27 at the transition from the stop surface 19 to the cone of the right half-journal 4. The inside surface 14 of the casing 2 is configured in such a way that the inner surface 14 terminates in the relieve groove 27. The projection extending into the relief groove 27 reduces the relative movement in this area.

FIG. 6 shows an enlarged view of the left half-journal 3 and the right half-journal 4 at the associated end surfaces 15. In the area of the end surface 15, the left half-journal 3 and/or the right half-journal 4 is configured with a sealing groove 28 to accept a seal 29. The shape of the sealing groove 28 depends on the shape of the seal 29. Any known seal can be used as the seal 29. This embodiment serves to prevent the escape of the oil under pressure in the case that one half-journal 3 or 4 is initially installed by itself

LIST OF REFERENCE NUMBERS 1 roll
2 casing
3 left half-journal
4 right half-journal
5 tie rod
6 through-bore
7 threaded bore
8 thickened area
9 seal
10 sear carrier
11 groove
12 left surface
13 right surface
14 surface
15 end surfaces
16 recess
17 bore
18 stop surface
19 stop surface
20 left end surface
21 right end surface
22 bore
23 plug
24 connector
25 end surface
26 water drain groove
27 relief groove
28 seal groove
29 seal

The invention claimed is:

1. A roll (1), especially a work or backup roll for a rolling mill such as a plate rolling mill, a flat rolling mill, or the like, with
a casing (2);
a left half-journal (3); and
a right half-journal (4);

wherein the half-journals (3, 4) are configured as truncated cones in the area surrounded by the casing (2) and form a left surface (12) on the left half-journal (3) and a right surface (13) on the right half-journal (4),
wherein
the left half-journal (3) and the right half-journal (4) are configured with bores (23) parallel to and radially spaced from a rotational axis of the roll, and corresponding grooves (11), wherein the grooves (11) are configured on the surfaces (12, 13).

2. A roll (1) according to claim 1, wherein the grooves (11) are circumferential or spirally circumferential.

3. A roll (1) according to claim 2, wherein the left half-journal (3) and/or the right half-journal (4) is configured with at least one axially parallel through-bore (6).

4. A roll (1) according to claim 2, wherein the left half-journal (3) and/or the right half-journal (4) is configured with a threaded bore (7).

5. A roll (1) according to claim 2, wherein the left half-journal (3) and/or the right half-journal (4) is configured with a sealing groove (28) to accommodate a seal (29).

6. A roll (1) according to claim 1, wherein the casing (2) comprises end surfaces (20, 21), which are configured with a water drain groove (26).

7. A roll (1) according to claim 1, wherein the inside of the casing (2) is configured as a truncated cone.

8. A roll (1) according to claim 1, wherein the casing (2) is made from a high-quality cast and/or forged, heat-treatable steel.

9. A roll (1) according to claim 1, wherein the casing (2) is configured on its outer circumferential surface with wear-resistant deposition welding.

10. A method for producing a roll (1) according to claim 1, wherein
the left half-journal (3) and the right half-journal (4) are inserted into the casing (2);
the right half-journal (3) and the left half-journal (4) are clamped together by means of at least one tie rod (5);
an oil under pressure is conducted into bores (22) and grooves (11) respectively in and on the left half-journal (3) and the right half-journal (4);
the oil under pressure exerts a pressure on the casing (2), by means of which the casing (2) is expanded; and
after the casing (2) has been expanded, the stop surfaces (18, 19) are pressed against the end surfaces (20, 21) of the casing (2) by means of the tie rod (5).

11. A method according to claim 10, wherein the roll is disassembled by reversing the steps.

12. A method according to claim 10, wherein the tie rod (5) is screwed into a threaded bore (7) introduced into one of the two half-journals (4, 5).

13. A method according to claim 10, wherein the outside surface of the casing (2) is provided with wear-resistant deposition welding.

* * * * *